United States Patent [19]
Kronstein et al.

[11] 4,126,591
[45] *Nov. 21, 1978

[54] DIRECT SURFACE MODIFICATION OF PIGMENTS BY PLANT PHOSPHATIDES FOR THEIR SUSPENSION IN COATING COMPOUNDS

[75] Inventors: Max Kronstein, Bronx, N.Y.; Joseph Eichberg, Atlanta, Ga.

[73] Assignee: American Lecithin Company, Atlanta, Ga.

[ * ] Notice: The portion of the term of this patent subsequent to Nov. 1, 1994, has been disclaimed.

[21] Appl. No.: 785,644

[22] Filed: Apr. 7, 1977

Related U.S. Application Data

[63] Continuation-in-part of Ser. No. 556,309, Mar. 7, 1975, Pat. No. 4,056,494.

[51] Int. Cl.$^2$ .......................... C09D 3/54; C09D 3/64; C09D 5/02
[52] U.S. Cl. ........................ 260/22 A; 106/15 R; 106/308 Q; 106/308 R; 260/29.2 E; 260/29.3; 260/37 R; 260/38; 260/40 R
[58] Field of Search ............ 106/15 R, 308 Q, 308 R; 260/22 A, 37 R, 40 R, 29.2 E, 29.3, 38

[56] References Cited

U.S. PATENT DOCUMENTS

| | | | |
|---|---|---|---|
| 2,201,064 | 5/1940 | Thurman | 260/403 |
| 2,465,733 | 3/1949 | Levis | 260/403 |
| 2,839,546 | 6/1958 | Davis | 260/403 |
| 2,997,398 | 8/1961 | Kronstein et al. | 106/14 |
| 4,056,494 | 11/1977 | Kronstein et al. | 260/22 A |

OTHER PUBLICATIONS

Alexander, Colloid Chemistry Theoretical and Applied, vol. VI, Reinhold Publishing Corp., N.Y., N.Y., 1946, pp. 263-267 and 316-320.

*Primary Examiner*—Ronald W. Griffin
*Attorney, Agent, or Firm*—Fisher, Christen & Sabol

[57] ABSTRACT

Coating compositions, such as, paints with mixed pigmentation containing pigment with widely different specific gravities, have the tendency to show in the pigment sedimentation a separation of the pigment components. Such separated components do not redisperse readily with the coating composition vehicle, upon shaking or mixing, to fully restore the initial color shades. The three factors of flotation, flocculation, and sedimentation cause the separation of the coating composition components. Plant phosphatides, which are referred to as lecithins, (and modified plant phosphatides) can be used as the only additive resulting in a joint sedimentation of the entire pigment mixture without separation of the pigment components from each other. As a result, on shaking or mixing, the entire pigmentation reenters the coating composition jointly, and the initial color shade of the coating composition is restored. The lecithin or modified lecithin is used in an amount between 4 to 10 percent based on the amount of pigment. Advantageously, the lecithin material is directly applied to the pigment surfaces. In such an embodiment, as little as 0.5 percent of lecithin can be used.

47 Claims, No Drawings

DIRECT SURFACE MODIFICATION OF PIGMENTS BY PLANT PHOSPHATIDES FOR THEIR SUSPENSION IN COATING COMPOUNDS

This is a continuation-in-part of our copending application Ser. No. 556,309, filed on Mar. 7, 1975, now U.S. Pat. No. 4,056,494.

BACKGROUND OF THIS INVENTION

1. Field of This Invention

This invention relates to the prevention of color variation in a coating composition, such as, a paint, wherein color is produced by a mixture of pigments having different densities, caused by the separation of the pigments during storage or drying of the coating composition. This invention further relates to the uniform dispersion of pigmentation even a mixed one such as one containing more than one pigment, such pigments varying in their specific gravities and their suspension characteristics, by treating the dispersion by the incorporation of lecithin materials.

2. Prior Art

In preparing and applying mixtures of powdered or crystalline substances (such as, pigments) having different physical properties (such as, different specific gravity or density or different oil absorption) dispersed in fluid media (such as, oils or resin solutions or other film-forming paint vehicles), it is essential not only to accomplish a uniform dispersion of the mixed components but also to obtain a state where such dispersed solid mixtures no longer have a tendency to separate from each other during storage of the dispersions. This is necessary because such pigment mixtures, comprising components of different specific gravity or different oil absorption, (after having been dispersed in the vehicle) tend to separate upon storage again into the various components. Therefore a paint consisting of pigments of different specific gravity will generally separate again with the heaviest component settling to the bottom of the paint and the less heavy components settling out there above. Shaking the stored mixture (in the vehicle) will not cause the separated materials to fully redisperse. Where such pigments have a different color, their initial dispersion in the vehicle represented a paint of a special color. But after separation of the components and after an incomplete remixing of the different pigments, the resulting product will not have the same color shade as when it had been produced initially. In paint production such a change in color shade due to these factors is highly undesirable.

Pigments having a similar specific gravity might vary in other physical properties which interfere with their uniform dispersion in fluid vehicles — this will result in undesirable separations during storage of the dispersion. It might, for instance, be economically desirable to use a high priced colored pigment with the addition of a more economical colorless additive or "extender" pigment despite the fact that two such kinds of pigments might have widely different physical properties. For instance, a chemical pure zinc yellow might have a similar specific gravity as a wet ground mica extender pigment. But the oil absorption of the zinc yellow might be half that of the mica extender. In dispersing mixtures of both in an oil modified alkyd resin vehicle, the two pigments will widely differ in dispersion properties and in uniformity of application. The extender with its more incomplete dispersion in the oil based vehicle will settle out during storage and will not fully be redispersed with the other component under shaking or mixing. A different colorshade will be obtained and upon application a different reflectance will be obtained — both are not desirable.

The literature and industrial practice have suggested various ways of improving the tendency of mixed pigments to separate in dispersions. For instance, a number of synthetic "surfactants" have been suggested for use in the dispersion of pigmentations, such as, non-ionic derivatives of fatty acid esters (like polyethylene glycol 400 mono oleate, or non-ionic sodium salts of sulfonic acid or others). A wide group of other chemical synthetic additives have been suggested with the aim of relieving the storage difficulties of the paints having mixed pigmentations. But all these represent chemicals which differ in their chemical nature from that of the dispersing coating vehicle and none are known to have fully succeeded in overcoming the problem of the separation of the pigment components in such dispersion.

In order to improve the stability of pigment mixtures in paints, the prior art defines pigment separation as the result of three factors: floating of light weight color components to the paint surface ("FLOTATION"), a renewed agglomeration of pigment particles due to poor pigment wetting ("FLOCCULATION") and the settling out of pigments according to the Stokes Law ("SEDIMENTATION"). Kress, Peter, Deutsche Farben Zeitung 24, 11, p. 521 (1970) teaches the following:

| FORMS OF PIGMENT SEPARATION AND MEANS FOR LIMITATION | | |
|---|---|---|
| TERM | DEFINATION | SUGGESTED MEANS OF LIMITATION |
| FLOTATION | THE FLOATING OF LIGHT WEIGHT COLOR COMPONENTS TO THE PAINT SURFACE | IMPROVE THE BONDING BETWEEN PIGMENT SURFACE AND BINDER BY A SOYALECITHIN (0.5 to 1.5% BASED ON THE VEHICLE.) |
| FLOCCULATION | RENEWED AGGLOMERATION OF PIGMENT DUE TO POOR PIGMENT WETTING. | REDUCE THE SURFACE TENSION OF THE BINDER BY A XYLENE SOLUTION OF A SILICONE OIL (0.5% to 1% BASED ON THE TOTAL VEHICLE). |
| SEDIMENTATION | SETTLING OUT, ACCORDING TO STOKES' LAW | RESTRICT THE FREEDOM OF MOTION OF THE PIGMENT PARTICLES BY A BENTONE (2 TO 5% BASED ON THE VEHICLE.) |

By way of review, the freedom of motion of the pigment particles is supposed to be restricted by the addition of a certain amount of Bentone and the surface tension of the binder is supposed to be reduced by incorporation of a silicone oil. A third additive (0.5 to 1.5 percent soya lecithin, based on the vehicle) is introduced in order to "improve the bonding between pigment surface and binder". Since none of the three additives is volatile, each of them remains a component in the applied and dry final paint coating even though each physical role is no longer required.

In common practice lecithin has been incorporated into compositions where the pigments are already in contact with a fluid coating compound, and amounts of up to 3 percent of lecithin by weight (in relation to the weight of the pigments) have been used in the prior art. U.S. Pat. No. 2,997,398 teaches the use of 1 to 6 percent of a metal lecithinate.

Certain colored pigments had first been processed in a specific average particle size, mixed then with a non-film-forming mineral oil (adding a small amount of surface active agent) and then milled in a colloid mill to a coherent paste. Besides certain organic acids or acid derivatives, the addition of lecithin was suggested. But none of these mineral oil pastes would be suitable in coating formulations because the mineral oil would interfere with the drying and curing of the applied coatings and again in such mineral oil pretreated pastes any direct application of the lecithin would no longer be possible on dispersed particles.

It has been suggested to pretreat pigment materials with a resin coating before placing them into paint formulations. Later, even when any lecithin would have been used in the formulation, the direct application of the lecithin to the pigment surface would no longer have been possible because of the pre-applied resin film.

Attention is drawn to U.S. Pat. Nos. 2,201,064, 2,465,733 and 2,839,546, and Alexander, "Colloid Chemistry—Theoretical and Applied," Vol. VI, Reinhold Publishing Corp., N.Y., (1946), pp. 263-267 and 316-320.

BROAD DESCRIPTION OF THIS INVENTION

An object of this invention is to provide a process for the prevention of color variation in paint, wherein color is produced by a mixture of pigments having different densities, caused by the separation of the pigments during storage or drying of the paint. A further object of this invention is to provide a uniform dispersion of pigments, even one containing more than one pigment, such pigments varying in their specific gravities and their suspension characteristics. Another object of this invention is to provide a composition to achieve the above object. Other objects and advantages are obvious from this application to one ordinarily skilled in the art.

The objects and advantages of this invention are achieved by this invention.

This invention approaches the problem of counteracting a separation of the components in a mixed pigmentation not as a result of a series of different factors, which would have to be overcome by individual additives, but as a single problem to achieve a joint sedimentation of all the components in a mixed pigmentation without allowing such solid components to separate from each other. Therefore, this invention does not acquire any reuniting afterwards, even when upon storage a gravitational joint-settling of the solid parts in the paint (the fluid vehicle) has occurred. Upon mixing or shaking, the joint sedimentation is dispersed again into the same condition that existed at the initial preparation of the suspension. This invention accomplishes such by the use of a certain amount of phosphatide which is produced from glycerin-fatty acid ester type oil-producing plants and which is commonly known under the term of lecithin material. The lecithins are not used in this invention to improve the bonding between pigment surfaces and binders, as has been recommended earlier by the prior art and not by limiting their use to such minimal amounts of 0.5 to 1.5 percent (based on the vehicle) as has been required by the prior art. This invention uses the lecithin as a new and decisive factor which maintains a joint state in mixed pigmentation within various dispersions.

This invention uses the lecithins (and modified lecithins) in novelly large amounts in relation to the total amount of dispersed pigmentation, such amounts being between 4 and 10 percent based on total pigmentation.

This invention also preferably uses the lecithins in such chemical form that is most suitable for the solvent-type used in the dispersion—that means varying the lecithin form for its use in pigment dispersions in organic solvents or in water dispersions. This can be accomplished because of the specific nature of these lecithin materials. Such phosphatidal materials represent glycerin esters containing two fatty acid groups (of saturated and of unsaturated fatty acids) and one phosphoric acid group, which is reacted with a component from the group of cholines, cephalines and inositols. Accordingly, such lecithin materials are also referred to as phosphatidyl cholines, phosphatidyl ethanolamines and inositol phosphatides. Any or all of these can be present in the crude forms of the plant lecithin materials used in this invention. Besides, since these materials are obtained from oil-producing plants, the crude lecithin materials might be obtained in a form also in which some amount of the plant oil is retained, or where the oil is present as a "carrier" for the lecithin materials.

Because of the complex nature of these materials, it is possible to modify them, for instance, by separating out the oil carrier. Even with retention of such carrier, the materials can be modified chemically by peroxide treatment, by hydroxylation, etc., and they can be "bleached" into a lighter color. And since, even in the oil-free form, the various types of the phosphatides vary in their chemical properties, it is further possible to separate these lecithin materials, for instance, into alcohol-soluble materials (which contain primarily the phosphatidyl cholines) and into alcohol-insoluble materials (which contain primarily the phosphatidyl ehtanolamines or cephalines and the inositol phosphatides). Besides, the fractions which are so obtained vary also in their molecular size. The alcohol-soluble fraction is lower in molecular size and retains a higher degree of residual reactivity, such as can be utilized in modifying the materials for this invention. And the alcohol-insoluble fraction is higher in molecular size and is further capable of forming (in the lecithin materials) high molecular formations, which are referred to generally as "micelles." The alcohol-soluble fraction can be present as a "sweller" substance in these micelles. And an equilibrium might exist in such micelles between the number of monomer phosphatides (lecithins) and the lecithin formations containing such number of monomers. Therefore, this invention can utilize the reactive forms of lecithin monomers either in separated form or in larger lecithin formations or even in a state where these formations are still present within an oil carrier.

In this invention the lecithin materials can not only vary between lecithins with and without oil carrier, but they can vary also in respect to the plants from whose seeds they are being produced—all of these types of lecithins are useful in this invention. The lecithins derived from the soybean (preferred) are applicable in this process, as well as the lecithins derived from corn or other oil-producing plants. (Lecithins vary and are affected by the presence of minor constituents, for example, small amounts of sterols, mineral matter, etc.)

To obtain increased stabilization of the lecithin materials in coating applicants have found that the lecithin materials can be modified effectively by introducing metal groups via heating the lecithins with certain metal chlorides or even more effectively with metal acylates, such as metal acetates. The metal acetates can be introduced in the lecithin materials directly without freeing them from the oil carrier. The lecithin materials can be purified of certain carbohydrates found in plant lecithins by dissolving the crude lecithin, for instance, in hexane and washing the carbohydrates therefrom by shaking the solution with diluted (e.g., 55 percent) alcohol. Afterwards, the purified oil-carrier lecithin material can be reacted with the metal acetate or organometal acetate (such as triphenyl lead acetate, dibutyl tin diacetate and others). The metal groups can even be more readily introduced into oil-carrier free lecithin, preferably the separated alcohol soluble fraction. All these forms of lecithin can be utilized to obtain a joint stabilization of mixed pigmentation and a joint sedimentation such as allows a full remixing with the vehicle merely by stirring or shaking.

In order to obtain such effects in water-based vehicles, the lecithin can be made water-dispersible by a treatment with lactic acid or its esters, or propylene glycol or alkyl esters of condensed ethylene glycol.

This invention also includes the novel modified lecithins described herein and the novel paint compositions described herein.

Organic coating materials, having a pigmentation consisting of several pigments of wide variation in specific gravity, possess, on storge, the tendency to show, in settling, an extensive separation of the pigment components. This is influenced also by the wetting conditions which prevail in these paint materials. This invention limits or fully avoids such separation of the pigment components by the incorporation of a particular amount of selected lecithin materials, obtained from oil-producing plants, and of their modifications and derivatives. The resulting joint sedimentation of the undivided pigment components allows a nearly full restoration of the initial color shades in the paint materials (the settled, mixed pigment being a loose and unseparated settling).

Paints which have been stored do not uniformly remix, but applicants have surprisingly found that paints will remix after storage with excellent and durable uniformity when more than conventional amounts of lecithin are used in or introduced into such paints. This is a difference in kind and is unobvious to one ordinarily skilled in the art.

The above-described embodiment of this invention achieves the object of obtaining successful and economical stable pigment dispersions. In the first embodiment, the lecithin is added to the pigment dispersion, whereby the pigments have already been prewetted or predispersed in the film-forming coating vehicle. The range of lecithin is between 4 and 10 percent or more. The higher amounts of incorporated lecithin in such paint compositions significantly improve the storage stability of such pigment dispersions in the coating vehicles and allow the stored paint upon mixing or shaking to return to its original grade of dispersion and its original color and state.

In a second embodiment of this invention, it has been established that the effect of the lecithin on the pigment dispersions is actually based on a direct contact effect between the pigment surfaces and the lecithin material. In the prior art, and even in the other embodiment of this invention, the lecithin has been introduced to a prewetted or predispersed pigmentation in the paint vehicle or in parts of such vehicle, the direct contact between the pigment surfaces and the lecithin being hindered and the contact actually taking place between the pigment and the lecithin material partially dispersed in the prior applied vehicle before the lecithin actually can directly modify the pigment surface. Therefore, the part of the introduced lecithin, which remains (as in the prior art) dispersed in the vehicle and which is not actually in direct contact with the pigment surface, remains inactive in the pigment surface modification.

The second embodiment of this invention applies the lecithin material directly to the pigment surface, whereby all the introduced lecithin can be utilized; therefore, a more uniform surface treatment is accomplished, a more effective pigment dispersion and stability of the pigment dispersion is obtained and the required amount of lecithin is being decreased. This decrease is caused by its more complete utilization in the second embodiment of this invention. The second embodiment of this invention, which involves a direct pigment surface modification by the lecithin before application of the paint vehicle, differs from prior art methods generally because there the surface had already been wetted or coated by the vehicle or parts of the vehicle before the lecithin had been entered. Herein the lecithin material is used directly on the pigment particles, so a uniform coating of the surface is obtained under a complete utilization of the lecithin effect on such pigments. This results in a uniform dispersion of the pigment particles under the most economical use of the lecithin components. As used in this invention the term lecithin means lecithin as such (phosphatidyl choline), and lecithin in its commercial form comprising a mixture of lecithin and associated phosphatides usually in a carrier of fatty oil or other compatible carrier for the phosphatides. This means lecithin with or without associated phosphatides subjected to varying degrees of purification as to produce phosphatide fractions more or less soluble in alcohol and the foregoing with or without suitable carriers.

DETAILED DESCRIPTION OF THIS INVENTION

The maintaining of color shades in the storing of paints with mixed pigmentation and the restoring of such shades in the case that a pigment sedimentation has taken place during storage is of importance to the paint industry. When the pigmentation is based on more than one pigment material, the shade will change when one of the components settles at a different rate than another. This takes place not only during extended storage, but is also observed during the drying of heavy film applications. During the period when the application still represents a kind of liquid film, the separation rate of sedimentation of any one of the pigment components can and often does cause color variations in the drying film.

The velocity of the settling for each of the pigment components has been expressed in applying Stokes' law as:

$$V = K \cdot (d_{Pi} - d_{Bi}) r^2 / \eta$$

$V =$ Velocity $d_{Pi}$ = Density of the pigment
$d_{Bi}$ = Density of the binder
$r$ = pigment radius
$\eta$ = Viscosity of the paint In mixed pigmentations, therefore, pigments having widely different specific gravitites can settle out differently, and they can behave differently in vehicles having different specific gravitities (or densities). Also, pigments of different particle sizes can differ in their settling according to the square of their particle size. After such separated settling has taken place, it is very difficult to restore a complete redispersion of the separated pigment components to produce the initial color shade again.

This invention uses lecithin (preferably soybean lecithin) in certain amounts to produce a considerable increase in maintaining, and in restoring color shades in paints with mixed pigmentation, even when pigments are being used which differ widely in their specific gravitites.

The separation of mixed pigmentation can be influenced by a floating of light weight color components to the surface of the paint (flotation), by a renewed agglomeration of the pigment particles (flocculation), and by the settling of the various pigments according to Stokes' law (sedimentation). The prior art has often recommended the use of different additives to counteract each of these factors individually (see the above prior art discussion). Applicants investigated the influence of using these components separately and jointly with the others — applicants found the basic approach of the Kress three-component system resulted in variations of the ultimate dry applied coating, in particular, the influencing on the gloss of the coating. Applicants investigations showed that the use of separate additives for the three factors of pigment separation continued to remain factors in the properties of the applied coating.

This invention is based upon the unexpected discovery that the introduction of certain amounts of certain lecithins (preferably certain modified) lecithin can limit the flocculation of the pigment components to a co-flocculation of the mixed pigmentation whereafter, by a remixing, the whole combination of pigmentation can again be restored on a durable and uniform basis.

Any lecithin (including modified lecithin) can be used in this invention, but unexpectedly better results are obtained when a lecithin is used which has been modified in certain manners explained below, and far better results are obtained when the soybean lecithin has been modified in a particular way explained below.

The term lecithin in general refers to the wide group of "phosphatides" which exist throughout the animal and plant world and can be described chemically as glycerol derivatives where two glycerol groups are bound to fatty acids and the third one to an amino-group-carrying phosphoric acid component. Or, more specifically they can be defined as di-glycerides of fatty acids with a third $CH_2OH$ group linked to the choline esters of phosphoric acid. In recent years lecithins have therefore been referred to as "choline phosphoglycerides". (Some of the phosphoric acid groups may be combined with a cephalin or inositol.) For its use in paints, lecithin belongs to the non-ionic surface active agents but it differs from most synthetic surface active agents by the fact that the monomer lecithin is capable of entering a number of chemical shiftings which result in the formation of micellar figurations. Hereby, intermolecular and intramolecular shiftings take place and the large aliphatic groups of the $CH_2$ and CH carbons of the glycerides facilitate this formation of the "micelle". This represents an aggregate compound of a number of molecules, held loosely by secondary forces. In particular, such micelles indicate the introduction of collodial systems where the micelles represent the components of the highest molecular weight constituents as the "disperse phase" in the system and where constituents of lower molecular weight represent the "continuous" or "intermicellar phase". In such formations derived from the plant world, the micelles may contain thousands of molecules and thus have rather high particle weights. Lecithins have a very complex nature.

Soybean lecithins are preferred. When referring to soybean lecithin it is to be understood that there exists a considerable difference between various lecithins, largely — if not altogether — due to the fatty acids which they contain. When soybean lecithin is produced industrially from soybeans the raw lecithin product usually contains in addition to the phosphatides, 35 to 40 percent of oil, which decreases the sensitivity of the lecithin to moisture and oxygen and is therefore supposed to have a stabilizing effect. But the raw lecithin product can further be refined and chemically modified; for example, modified soybean lecithins as "bleached" or "peroxide treated" (hydroxylated) soybean lecithin, or products where the oil fraction is more or less removed, or soybean lecithin in which a treatment with lactic acid (or its esters) has increased the capacity of the oil-free phosphatides to be dispersed in water for use in aqueous emulsions. (How far each of these modifications influences also the capacity of the lecithin to form micellar structures has not been fully established.)

The crude form of the plant-lecithin materials are obtained from oil producing plants, the crude lecithin materials can be obtained in a form also in which some amount of the plant oil is retained, and where as much as 35 to 40 percent of the oil is retained as an "oil carrier" of the lecithin material. If it is soybean lecithin, the soybean carrier represents a corresponding glycerin ester having three fatty acid groups, two of which correspond to the two fatty acid groups of the soybean lecithin material.

Wittcoff, H., "The Phosphatides", (American Chemical Society, Monograph Series), Reinhold Publishing Corporation, New York (1951), page 222, teaches a process for separating the soybean phosphatides into alcohol-soluble and alcohol-insoluble fractions which vary in their properties. The alcohol-soluble fraction in particular is highly reactive and allows the introduction of metal organic groups, or it can be sulfurized for use in rubber/solvent dispersions. This alcohol-soluble fraction is a preferred modified lecithin for use in this invention.

This preferred form of soybean lecithin, and other lecithins, is based on the fact that in the oil-free form two phases are present in the lecithin material. It is possible to separate these as the alcohol-soluble materials, which contain primarily the phosphatidyl choline, and the alcohol-insoluble materials (which contain primarily the phosphatidyl ethanolamines, or "cephalins", and the inositol phosphatides). Therefore, in the Infrared Spectrum, a "granular" oil free lecithin appears as a combined spectrum of both groups, and the separated spectra show main differences in the range between 6 and 7 microns. These fractions vary also in molecular size. The alcohol-soluble fraction is lower in molecular size and higher in the content of monomer matter, and, therefore, retains also a higher degree of residual reactivity. The form in which the lower molecular matter can react, has been explained in different ways. It has been pointed out that the monomer lecithin is capable of entering a number of chemical shiftings (inter-molecular and intra-molecular) which result in the formation of "micellar" figurations — Pfeiffer, J. Ph., "Definitions and Concepts to the Properties of Asphaltic Bitumina", Elsevier (1950), page 8. The alcohol-insoluble fraction is higher in molecular size and is capable of forming, in the lecithin materials, high molecular formations. In this process both fractions together become a part of the micelles in the lecithin. This has also been explained as an aggregate compound of a number of molecules held loosely by secondary forces — Hackh's "Chemical Dictionary", IIIrd Edition, page 536. Such micelles indicate the introduction of collodial systems, where the micelles represent the components of the highest molecular weight constituents as the "disperse phase", and where the constituents of lower molecular weight represent the "continous" or "intermicellar" phase — Pfeiffer, ibid., p. 8. In other papers this author usually referred to the effect of the lower molecular fraction as the "sweller phase" of the colloidal system.

The most preferred embodiment of this invention is the use of a soybean lecithin modified in the way described below—unexpectedly the best results by far are obtained. The soybean lecithin is modified by first separating the lecithin into an alcohol-soluble fraction and an alcohol-insoluble fraction and by then converting (by reaction) the alcohol-soluble fraction with 10 percent of organometal acetate, such as triphenyllead acetate (organolec L) or di-butyl tin diacetate (organolec T), until the mixture turns into a dark, clear brown material. These metal lecithinates alone, or 9:1 or 4:1 mixtures thereof with synthetic surfactants, cause a coflocculation in alkyl paints, whereby when the paint mixture is shaken for one minute, the paint is restored to its initial color shade. The alkyd paint without such additive does not return to its initial shade, and alkyd paint with synthetic surfactant alone returned only partially to the initial color shade.

This invention uses from 4.0 to 10 percent (or more), or 1.5 percent of lecithin or modified lecithin, based on the total pigment in the paint or vehicle. Preferably from 6.1 to 8 percent, and most preferably about 6.5 percent, of lecithin or modified lecithin, based on the total pigment in the paint, is used.

The second embodiment of this invention comprises a direct modification of the pigment surfaces by treating them in a prior step of operation with the plant phosphatides (the so-called lecithins) and their modifications and making such lecithin-treated pigmentation a part of the coating compositions in a second step of operation. The process utilizes the higher molecular weight constituents of the lecithins (also referred to as the "disperse phase" of the phosphatides) for a direct application to the surfaces, without necessarily separating the phases first from constituents of lower molecular weight, which represent the "continuous" or "intermicellar" phase of the commercial phosphatides. Such mixed-fraction conditions or multiphase condition can also be referred to as heterophase materials. By such direct contacting of the higher molecular phase with the surfaces of the pigmentation, an actual coating effect is being obtained on such surfaces which represents a lasting modification of such surfaces. This differs from the conventional "wetting" of pigments with fluid surfactants, such as serve to displace air and moisture on the surface layer of the pigment particles but which later dissolve in the added paint vehicle without leaving a lasting surface coating on the pigment units.

In utilizing the high polymer fraction which exists within the plant phosphatides and their modifications, it is an aim of this embodiment of this invention to produce on the pigment surfaces repulsive conditions, which avoid the formation of pigment conglomerates in the coating compositions.

This approach to the "repulsive" effects of selected layers over crystal surfaces is in agreement with the literature. E. L. Mecker reported in the *J. Colloid Interface Sci.,* Vol. VI, pp. 492–495, and Vol. VII, pp. 535–550 [Chemical Abstracts, Vol. 46, No. 809 c(1952), and Vol. 47, No. 945 i (1953)] that he observed repulsive effects between parallel plates to which a monolayer of substituted aromatic molecules had been adsorbed. And Tatsuo Sato (Chemical Abstracts, Vol. 82, 141633/34) explained such effects as "steric hindrance or entropic repulsions" between the adsorbed polymers on the approaching particles. But it had not been known that such physical phenomena can be utilized in obtaining useful and applicable properties with the aim of systematically modifying the properties of major amounts of powdered or crystallized small sized units, such as are applicable as pigmentation within film-forming components.

It had not been known that the plant phosphatides and their modifications can produce such phenomena between the manyfold and irregular surfaces of pigments and pigment mixtures which allow their joint sedimentation without producing conglomerates between them and so allowing their free redispersion after storage. This new finding gives an additional explanation for the "joint suspension of mixed pigmentation" achieved by active effects of plant phosphatides achieved by the first embodiment of the invention, which achieves such suspensions by the addition of limited amounts of lecithin or modified lecithin to previously produced pigment dispersions. In such case, the pigments had been wetted by other vehicle components before and therefore the adherence of the higher molecular lecithin fraction had to take place on a prewetted surface.

To recap, in the second embodiment of this invention the lecithin is applied directly as the first wetting fluid or in a mixture of fluids. The lecithin is used either in a fluid (oily) form, as the so-called oil carrier-containing lecithin, or in solvent dispersions of the deoiled solid lecithin form or of its granular preparations. Therefore, full contact is achieved and a coating effect remains a uniform and stable property of the treated pigment even after such pigments have been dispersed in various paint vehicles. This is because such applied polymeric surface layers on the pigment surfaces are much less soluble in the subsequently introduced vehicle of the paint than is the case with low-molecular fluid applications, such as in the use of fluid "wetting agents" of the prior art. Also, due to the direct application of the lecithin to the pigment surface, all of the applied lecithin is effectively utilized and the amount of the required lecithin is lowered due to the elimination of the loss of lecithin as in the case of a vehicle being applied before actually treating the pigment surface with lecithin.

All parts, ratios, percentages and proportions in this application are on a weight bases, unless otherwise stated or obvious to one ordinarily skilled in the art.

EXAMPLE 1

A dispersion of pigments having different specific gravities was prepared using the following composition:

| PIGMENT DISPERSION | |
|---|---|
| Red lead oxide (sp. gravity 9) | 300 grams |
| Titanium dioxide, rutile (sp. gravity 4.2 | 360 grams |
| Alkyd resin solution (70% NV) (long oil soya type with 23% phthalic anhydride) | 330 grams |
| Toluene (solvent) | 100 grams |

The pigment dispersion was ballmilled. 50 grams of the pigment dispersion was diluted with 10 grams of toluene (solvent); and another 50 grams of the pigment dispersion was diluted with a solution of 2 grams of soybean lecithin (oil carrier type, hydroxylated) and 8 grams of toluene diluent. When these two freshly prepared paints were applied on white bond paper, the resulting coatings had in both cases a blue filter reflectance of 36.9. After two weeks storage at room temperature, the paint without lecithin had separated into two layers; a light layer whose film application gave a blue filter reflectance of 91.0; and a heavier red-bottom layer whose film application gave a blue reflectance of 13.9. As an illustration of this invention, the paint containing lecithin showed a single layer settling out whose film application gave the blue filter reflectance of 36.9. Upon vigorously shaking (for one minute) the paint without lecithin, the initial reflectance of the film application was not restored; the paint with lecithin, upon similar vigorous shaking, showed a reflectance of 38, or nearly complete recovery of the initial condition.

The reflectance readings of each layer applied to white bond paper was made with a Photovolt Gloss Meter #660.

Similar results as above are obtained when the toluene is replaced with an aromatic or aliphatic diluent or solvent.

EXAMPLE 2

To fifty gram batches of the pigment dispersion of Example 1 were added various compositions in 10 gram amounts. When 2 grams of polyethylene glycol 400 mono oleate (surfactant) and 8 grams of toluene (with no lecithin) were added, the stored and then the re-shaked paint had a reflectance of 53.0, instead of the initial 36.9 due to an incomplete recovery. When 2 grams of mixture (solution) of 9 parts of hydroxylated soybean lecithin and one part of the same surfactant and 8 grams of toluene were added, the joint sedimentation had a blue filter reflectance of 37.1 and showed, upon remixing, nearly complete restoration of the reflectance value of 36.9. When 2 grams of 4 parts of hydroxylated soybean lecithin and one part of the same surfactant and 8 grams of toluene were added, the joint sedimentation had a blue filter reflectance of 39.7 and showed, upon remixing, nearly complete restoration of the reflectance value of 36.9.

So it was found that upon addition of a lower molecular synthetic wetting agent, or surfactant, as diluent to the lecithin, the characteristics of a joint flocculation of the mixed pigmentation, under the effect of the lecithin and their nearly complete re-mixibility, remained unchanged. Similar tests with nonyl phenol polyethylene gave similar results. The use of any synthetic non-ionic ester type surfactant, such as, produced from the groups of non-ionic derivatives of certain oils or fatty acid esters, or anionic sodium salts of sulfonic acid, gives similar results of an incomplete re-mixing of the separated sedimentation, when used without lecithin, but nearly fully re-mixing when used as part of a lecithin mixture (solution).

EXAMPLE 3

Using the above-noted Kress paper to incorporate a Bentone besides the lecithin into the mixed pigmented paints, in order to restrict the freedom of motion of the pigment particles, comparative paints were made using Bentone. Bentone 38 was used and is an ion-exchange-treated bentonite. A first test paste (pigment dispersion) was prepared (as in Example 1) from 300 gm of red lead oxide, 360 gm. of Rutile titanium dioxide, 330 gm. of longoil, soya, alkyl resin and 100 grams of toluene. An identicial pigment dispersion (second) was made which also contained 5.5 gm. of Bentone 38 (used in a 10 percent dispersion of two parts of methanol and one part of toluene). Tests were made as in Examples 1 and 2 with (a) a mixture of 50 grams of the first pigment dispersion and 10 grams of toluene, (b) a mixture of 50 grams of the second pigment dispersion and 10 grams of toluene, (c) a mixture of 50 grams of the first pigment dispersion, 2 grams of lecithin (standard grade) and 8 grams of toluene, (d) a mixture of 50 grams of the second pigment dispersion, 2 grams of lecithin and 8 grams of toluene, (e) a mixture of 50 grams of the first pigment dispersion and 10 grams of a solution of 4 parts of lecithin and 1 part of nonyl phenol polyethylene (surfactant) and (f) a mixture of 50 grams of the second pigment dispersion and 10 grams of the 4:1 lecithin-surfactant solution. (The lecithin used was a soybean lecithin which still contained about 35% oil carrier, and which had been treated with hydrogen peroxide, or "hydroxylated".) The results showed that, without the presence of lecithin, the incorporation of Bentone did not avoid a complete separation of the pigment components. Using the Bentone jointly with lecithin, or with a 4:1 mixture of lecithin and nonyl phenol polyethylene, prevents the separation of the pigment components. However, after remixing, the paints containing the Bentone and lecithin remained lower in reflectance in each of the three filter readings than when the lecithin had been used without the addition of Bentone. Also, the addition of small amounts of a silicon fluid did not change the characteristics of the test paints obtained with the Bentone.

EXAMPLE 4

Example 1 and Example 2 were repeated, except that the oil-carrier type soybean lecithin was replaced with oil-carrier type corn lecithin. The test results were about the same as in Example 1 and Example 2. (The dried coating was slightly darker than when hydroxylated soybean lecithin was used).

EXAMPLE 5

Examples 1 and 2 were repeated, except that the oil carrier-type lecithin was replaced by a solvent solution of an oil-freed, or granular, lecithin. Joint flocculation and nearly complete remixability of the sedimentation were observed again, as in Examples 1 and 2.

EXAMPLE 6

The oil-carrier-free lecithin was further separated into an alcohol-soluble lecithin fraction and an alcohol-insoluble lecithin fraction. Each lecithin fraction was tested as in Examples 1 and 2. Using each fraction, it was found that effectiveness of the lecithin in obtaining joint flocculation and remixibility of the sedimentation and of the fluid layer into their initial state was retained (as in Examples 1 and 2).

EXAMPLE 7

Example 1 was repeated, except that the oil-carrier type soybean lecithin was first freed from carbohydrate impurities by dissolving the lecithin in hexane and then washing the solution with 55 percent ethyl alcohol. The purified lecithin resulted in an even higher degree of joint sedimentation and of remixibility of the sedimentation condition into the initial state of reflectance (than occurred in Example 1). (The treatment with the diluted alcohol removes impurities without taking out some of the alcohol-soluble lecithin fraction, which would be taken out when 95% alcohol would be used.)

EXAMPLE 8

The test procedure of Example 1 was repeated except that the mixed pigment dispersion used a modified phenolic resin vehicle instead of the oil-based alkyl resin. The modified phenolic resin vehicle was based on a t-butyl phenol formaldehyde resin which was heat-reacted with tungoil and with bodied linseed oil into an air-drying varnish with 25 gal. oil length. Tests were made in Example 1 with (a) a mixture of 50 grams of the pigment dispersion and 25 grams of toluene, (b) 50 grams of pigment dispersion, 25 grams of toluene and 5 grams of lecithin, (c) 50 grams of pigment dispersion, 25 grams of toluene and 5 grams of a solution of lecithin and a minor amount of nonyl phenol polyethylene, and (d) 50 grams of pigment dispersion, 25 grams of toluene and a solution of one part of lecithin and 2 parts of the above surfactant. The most complete uniformity of the sedimentation and of the recovery was obtained with the lecithin paint.

It has been pointed out, earlier, that the velocity of the pigment settling can be expressed, according to Stokes' law, with the specific gravity of the pigment as well as the specific gravity of the vehicle being factors in the equation. By changing the vehicle, from a modified alkyl resin solution, to a modified phenolic resin vehicle, the changes in the vehicle relate not only to the specific gravity of the vehicle but also to the wetting properties and to the surface tension within the binder. Therefore, certain variations in the settling, as well as in the degree of effectiveness of the additives, were to be expected. (The selected varnish vehicle was based on a t-butyl phenol-formaldehyde resin, which was heat-reacted with tung oil and with bodied linseed oil into an air-drying varnish with 25 gal. oil length.) The paints containing hydroxylated lecithin, upon settling of the mixed pigmentation, showed a slight layer formation. That means under the test conditions, complete co-flocculation did not take place, however, the difference in color between the top layer and the sedimentary layer was small compared to the paints without lecithin.

In order to express the relationship in the color between the reflectance readings of the top layer and of the sedimentation layer in a comparative number, a factor was introduced, expressing the reflectance of the applied top layer (applied on white bond paper) divided by the reflectance of the applied sedimentary layer (applied on white bond paper) and this value multiplied by 100. This factor, with the blue filter reflectance readings, for the test paint with hydroxylated lecithin was not much above 100. This means the difference in the reflectance readings between the two layers was small. For the paint without additive, it was greater than 300, and, with the paint with synthetic surfactant, it was still greater. The addition of 33 percent of lecithin to the synthetic surfactant did not lower the difference. This indicated that this surfactant increased the wetting of each of the pigment components to a greater degree and increased the pigment separation under these conditions.

These differences appeared, also, in the physical state of the sedimentations, which were hard without additives, quite soft with the surfactant alone or with lecithin, and very soft and readily redispersible with the lecithin as the only additive. The color differences of the layers were apparent also in their film applications on white bond paper. Here, the lecithin materials maintained a state of joint flocculation when used alone, but not when diluted with the synthetic surfactant.

EXAMPLE 9

Similar results to those of Examples 1 and 2 can also be obtained with mixed pigmentation also when the pigment dispersions have a water-based vehicle, such as, latices and similar water-based paint vehicles, provided the lecithin material has been made "water-dispersible". The lecithin is made water-dispersible by hydoxylation by treating the lecithin with agents such as lactic acid and its modifications, and by any other suitable treatment, such as, by the addition of suitable wetting agents or surfactants, more paticularily, those which have been ethoxylated. To obtain stability of their mixed pigmentations such water dispersible lecithin forms can be used by themselves or in mixtures with synthetic wetting agents and dispersants (which are also water dispersible). In using the mixed pigmentation in a water based paint composition, the physical conditions in the paint are changed in the specific gravity as well as in the internal viscosity of the vehicle and its wetting condition.

Soybean lecithin was rendered water dispersible by treatment with lactic acid (the same could be achieved by treatment with esters of lactic acid or with propylene glycol or by alkyl esters of condensed ethylene glycol). The pigment dispersion was obtained from 90 gm. of titanium dioxide (sp. gr. 4.2), 40 gm. of basic lead silico-chromate [based on 47 percent lead oxide (sp. gr. about 9), 47.6 percent silicon dioxide (sp. gr. about 2) and 5.4 percent chromium dioxide (sp. gr. about 5.4)], 150 gm. of acrylic latex and 50 gm. of water. As in Example 1, the various pigment dispersions were allowed to stand at room temperature. The pigment dispersion (without additive) upon standing formed two layers which differed widely in their reflectance. Upon application to white bond paper, the white paint layer differed from the colored layer, in the blue filter reflectance readings, by 35.5 points. When synthetic wetting agent was added to some of the pigment dispersion, the synthetic wetting agent wetted each of the two pigments to a greater extent, the pigments settled out more from each other, and the difference in the reflectance readings increased to 50 points. When one part of the synthetic wetting agent and two parts lecithin material was added to some of the pigment dispersion, the results were about the same. When the water dispersible lecithin was added to some of the pigment dispersions, however, the pigments in the dispersion approached a state of joint flocculation, and the difference in reflectance decreased to 18.5 points.

EXAMPLE 10

The procedure of Example 1 was repeated with modification. A pigment paste was prepared from 9 gm. of synthetic iron oxide, 22 gm of zinc oxide, 40 gm. of methyl ethyl ketone and 30 gm. of benzene (and then ball-milled). A hydroxylated lecithin was first heated with 10% of zinc acetate until the acetic vapours had been driven off and the metal had been introduced into the lecithin material. A first alkyd dispersion was prepared from 100 gm. of long-oil soya-type alkyd resin, 30 gm of toluene and 2 gm of cobalt drier (12 percent Co). A second alkyd dispersion was prepared from 92 gm. of the same alkyd resin, 30 gm of toluene, 2 gm of the same cobalt drier and 8 gm. of the zinc acetate-modified lecithin. 30 gm. of the pigment dispersion was added to 132 gm. of each of the alkyd dispersions. The behavior of the prepared test paints showed again the full co-flocculation and remixibility of the mixed pigmentation when prepared with the metal group carrying lecithin.

To obtain increased stabilization of the lecithin materials in coatings, it was found that such can be done by modifying them by introducing metal groups. The modification can be accomplished by heating the lecithins with certain metal chlorides, or even, more effectively, with metal acylates, such as metal acetates (such as 5 to 10 percent of zinc acetate). Also they can be heated with organo metal acylate (such as 5 to 10 percent of triphenyl lead acetate, tributyl tin acetate, di-butyl tin di-acetate, and others). The metal acetates can be introduced in the lecithin materials directly without first freeing them from the oil carrier. The materials can be further purified of certain carbohydrate components in the plant lecithin by dissolving the crude lecithin, for instance, in hexane, and washing the carbohydrates therefrom by shaking the solution with diluted (e.g., 55 percent) ethyl alcohol. Afterwards, the purified oil-carrier lecithin materials can be reacted with the metal acetate.

The metal groups can be even more readily introduced into oil-carrier-free lecithin, in particular, into the separated alcohol-soluble fraction. It is especially good to introduce organo metal groups into such lecithin. By way of example, titanium dioxide and red lead oxide pigmentation were dispersed in a alkyd solution. To 50 grams of this pigment dispersion were added a mixture 2 grams of zinc lecithinate and 8 grams of aliphatic mineral spirits, or a mixture of zinc lecithinate with a synthetic surfactant. There was no separation of the two pigment components. The tests show that the specimens with the pre-purified lecithin base resulted in a looser joint sedimentation than with the zinc lecithinate obtained from the crude lecithin. But, on shaking, all of the samples showed, in their applied films on white bond paper, about identical reflectance readings.

In order to demonstrate that the metal lecithinates do become active components in the vehicle, two organo metal lecithinates were introduced into unpigmented elastomeric polymer dispersions, such as, synthetic rubber dispersions in toluene. Then, from the rubber dispersions without metal lecithinates, and from the same kinds of rubber dispersions containing organo metal lecithinates, the fractions were precipitated which fell out on addition of ether petroleum. These precipitates were compared. Changes took place in the rubber matter, which contained the lecithinate with the organo-lead modified lecithin and in the organo tin modified lecithin.

EXAMPLE 11

Using the procedure of Example 10, a preparation was used instead which contained lecithin reacted with 10 percent of tributyltin acetate. The organometal modified lecithin which combined the advantage of providing the joint stability for the mixed pigmentation with the advantage of the specific properties of the organo-metal compound is used. In this way paints with stable mixed pigmentation can be produced which have antimold and antifouling properties.

EXAMPLE 12

In paints having vehicles which are any form of polyhydroxyl alcohol-fatty acid ester type oil or materials containing any form of such oils within their resinous formations (and having or not having mixed pigmentations), lecithins and its modifform can be used to obtain in such vehicles (paints) a joint and stable dispersion of pigmentations also wherein the pigment components differ not as much in their specific gravity as in other physical properties (in particular in their oil absorption).

A mixture of 30 parts of a colored and high priced pigment like zinc yellow (having an oil absorption of 31) and 20 parts of a colorless, but economical extender pigment, like wet ground mica (having an oil absorption of 60) were added to a alkyd vehicle. No separation of the pigment components took place after 3 to 5.5 percent of soluble oil-carrier containing soybean lecithin was introduced. The stored suspension was easily restored (after a joint settling of the pigment components during storage) by simply shaking the mixtures — the initial colorshade returned. Without the addition of the lecithin component, the extender pigment settled below the yellow suspended pigmentation and did not remix into the initial colorshade.

EXAMPLE 13

A pigment dispersion was prepared as in Example 1 from 300 grams of red lead, 360 grams of titanium dioxide (rutile), 330 grams of alkyd resin (70 percent solids) and 100 grams of odorless mineral spirits. Batches of the pigment dispersion were admixed with ALCOLEC Z-3 (a chemically modified soybean lecithin manufactured by the American Lecithin Company of Woodside, New York) or ALCOLEC DS (a highly bleached soybean lecithin manufactured by the same company) and odorless mineral spirits (an aliphatic solvent) in the following amounts:

| Paint No. | Paint Composition | Percentage Lecithin In The Paint |
|---|---|---|
| A | 50 grams pigment paste<br>2 grams ALCOLEC Z-3<br>8 grams odorless mineral spirits | 4% on paste, or 6.6% on pigment, or 13% on alkyd (70%NV), or 3.3% on whole paint. |
| B | 50 grams pigment paste | 2% on paste, or 3.3% on pigment, or 6.5% |

-continued

| Paint No. | Paint Composition | Percentage Lecithin In The Paint |
|---|---|---|
| | 1 gram ALCOLEC Z-3<br>8 grams odorless mineral spirits | alkyd (70%NV), or 1.65% on whole paint. |
| C | 50 grams pigment paste<br>0.5 gram ALCOLEC Z-3<br>8 grams odorless mineral spirits | 1% on paste, or 1.65% on pigment, or 3.25 on alkyd (70%NV), or 0.825% on whole paint. |
| D | 50 grams pigment paste<br>0.25 gram ALCOLEC Z-3<br>8 grams odorless mineral spirits | 0.5% on paste, or 0.825% on pigment, or 1.625% on alkyd (70%NV, or 0.4125% on whole paint. |
| E | 50 grams pigment paste<br>2 grams ALCOLEC bleached DS<br>8 grams odorless mineral spirits | 4% on paste, or 6.6% on pigment, or 13% on alkyd (70%NV), or 3.3% on whole paint. |
| F | 50 grams pigment paste<br>1 gram ALCOLEC bleached DS<br>8 grams odorless mineral spirits | 2% on paste, or 3.3% on pigment, or 6.5% on alkyd (70%NV), or 1.65% on whole paint. |
| G | 50 grams pigment paste<br>3 grams ALCOLEC bleached DS<br>8 grams odorless mineral spirits | 6% on paste, or 9.9% on pigment, or 19.5% on alkyd (70%NV), or 4.95% on whole paint. |

The paint samples go from 2 grams ALCOLEC Z-3 in 50 grams paste (with 6.6% of the pigmentation or 3.3% of the total paint) gradually down to 0.25 gram of ALCOLEC Z-3 in 50 grams paste (or 0.825% of pigmentation or 0.4125% of the whole paint).

The following is the results of settling tests:

| Paint No. | Observations |
|---|---|
| A | Settles, but is readily remixable on shaking. Coating very uniform. |
| B | Settles, still readily mixed, but coating streaky. |
| C | Settles, but is gradually shaken into mixture. Coating not regular. |
| D | Settles, still more slowly mixed upon being shaken. Settles again, when applied, before film dries. |
| E | Settles. Well remixable, but coating not as uniform as Paint No. A. |
| F | Settles. Upon being shaken, mixes back very slowly. Coating streaky. |
| G | Settles, but well remiscible and gives uniform coating similar as Paint No. A. |

The following are the reflectance readings of the applied paints:

| Paint No. | Reflectance Readings of the Applied Paints | | | Comments |
|---|---|---|---|---|
| | Filter: Green | Amber | Blue | |
| A | 68 | 74 | 59.5 | Readings of the uniform paint. |
| B | 68.5 | 74 | 60.5 | Difference compared to Paint No. A, due to the white streaking. |
| E | 68 | 74 | 60 | Compared to Paint No. A, slight streaking effect due to DS. After longer storage is less recombined than Z-3. |
| F | 68 | 74 | 61.5 | Compared to Paint No. E, higher streaking effect; and against Paint No. B, same as result of changing from Z-3 to DS. |
| C | 68 | 74 | 60 | |
| D | 72 | 75 | 68 | Lecithin nearly not effective in remixing high amount of white component because percent of lecithin too low. |
| G | 68 | 74 | 61 | Slightly darker than Paint No. A (in blue filter reading) but uniform. (The color difference might be due to the grade of lecithin). |

There is a difference between the use of hydroxylated Z-3 and bleached regular type DS. The paint with 2 grams lecithin Type DS to 50 grams paste was still a bit streaky; using 3 grams lecithin DS also produced uniform coatings (with lecithin-type Z-3 these were obtained with the lower percent of lecithin).

Paint No. A. with about 6.5 percent lecithin (based on the pigment) wasy by far the most uniform of the applied re-mixed paints with lecithin type Z-3. Paint No. B and Paint No. C decreased gradually in uniformity and Paint No. D (which has lecithin at a level slightly above that taught by the prior art) separated so fast that the paint appeared remixed when it was being applied, but in drying the heavy (red) pigment has already settled out below the lighter white one. The data shows that to achieve the benefits of this invention lecithin is required in higher amounts than the prior art and conventional use. On the other hand, the specimens show that all the paints of the lecithin type Z-3 series continued to dry well despite the higher lecithin amount (up to 6.6 percent based on the pigment). On the other hand, the samples using bleached ALCOLEC DS instead of hydroxylated ALCOLEC Z-3 show that to achieve the full effect of this invention requires somewhat more lecithin of such type in order to obtain complete remixing. And the paint having 50 percent more lecithin type DS than with lecithin type Z-3 is dried slower due to the very high amount of lecithin (nearly 10 percent based on the pigment).

Similar results were obtained when benzene was used in place of the odorless mineral spirits.

EXAMPLE 14

A pigment dispersion was prepared as in Example 1 from the ingredients listed in Example 13. Batches of the pigment dispersion were admixed with the alcohol soluble fraction of soybean lecithin and odorless mineral spirits in the following amounts.

| Paint No. | Paint Composition | Percentage Lecithin In the Paint |
|---|---|---|
| H | 50 grams pigment paste<br>2 grams alcohol soluble lecithin fraction<br>8 grams aliphatic solvent (odorless) | 6.6% on pigment,<br>7.2% on vehicle |
| K | 50 grams pigment paste<br>1 gram alcohol soluble lecithin fraction<br>8 grams aliphatic solvent (odorless) | 3.3% on pigment,<br>3.6% on vehicle |
| L | 50 grams pigment paste<br>0.5 gram alcohol soluble lecithin fraction<br>8 grams aliphatic solvent (odorless) | 1.65% on pigment,<br>1.8% on vehicle |
| M | 50 grams pigment paste<br>0.25 gram alcohol soluble lecithin fraction<br>8 grams aliphatic solvent (odorless) | 0.825% on pigment<br>0.9% on vehicle |

After one week's storage the paints were shaken again and applied to white Bond paper.
The following are the reflectance readings of the applied paints:

| Paint No. | Filter: | Reflectance Readings of The Applied Paints | | | Comments |
|---|---|---|---|---|---|
| | | Blue | Green | Amber | |
| H | | 41 | 60 | 78 | Uniform Film |
| K | (some areas) | 59 | 71 | 87 | Streaky Film |
| | (other areas) | 64 | 73 | 87 | |
| L | (some areas) | 59 | 72 | 84 | More Streaky |
| | (other areas) | 66 | 76 | 84 | |
| M | (some areas) | 59 | 71 | 84 | Very streaky |
| | (other areas) | 70 | 79 | 84 | |

Paint No. H (with lecithin at 6.6 percent based on the pigment) redispersed fully and uniformly. Paint No. K (with lecithin at 3.3 percent based on the pigment) showed some appearance of the white layer coming to the top of the mixed and applied paint. Paints No. L and No. M (with still lower lecithin amounts) increased even further in lack of redispersion. In this invention, the amount of lecithin should be between 4 and 10 of the total pigmentation. When the lower amounts shown by the literature (with 0.5 and 1.5 percent based on the vehicle) are used, the advantageous effects of this invention are not achieved.

EXAMPLE 15

A pigment dispersion was prepared as in Example 1 from the ingredients listed in Example 13. Batches of the pigment dispersion were admixed with corn lecithin and odorless mineral spirits in the following amounts.

| Paint No. | Paint Composition | Percentage Lecithin in The Paint |
|---|---|---|
| N | 50 grams pigment paste<br>2 grams corn lecithin<br>8 grams aliphatic solvent (odorless) | 6.6% on pigment,<br>7.2% on vehicle |
| O | 50 grams pigment paste<br>1 gram corn lecithin<br>8 grams aliphatic solvent (odorless) | 3.3% on pigment,<br>3.6% on vehicle |
| P | 50 grams pigment paste<br>11 0.5 grams corn lecithin<br>8 grams aliphatic solvent (odorless) | 1.65% on pigment,<br>1.8% on vehicle |
| R | 50 grams pigment paste<br>0.25 grams corn lecithin<br>8 grams aliphatic solvent (odorless) | 0.825% on pigment<br>0.9% on vehicle |

After one week's storage the paints were shaken again and applied to white Bond paper.
The following are the reflectance readings of the applied paints:

| Paint No. | Filter: | Reflectance Readings of The Applied Paints | | | Comments |
|---|---|---|---|---|---|
| | | Blue | Green | Amber | |
| N | | 50 | 66 | 82 | Uniform Film |
| O | (some areas) | 48 | 62 | 79 | Streaky Film |
| | (other areas) | 55 | 67 | 84 | |
| P | (some areas) | 50 | 63 | 78 | More Streaky |
| | (other areas) | 54 | 66 | 84 | |
| R | (some areas) | 45 | 61 | 80 | Very Streaky |
| | (other areas) | 64 | 76 | 85 | |

The lowering of the lecithin amounts decreased the complete redispersion of the settled pigment, and the paint applications became streaky when the lecithin amount had been decreased. In this invention, the amount of lecithin matter used should be between 4 and 10 of the total pigmentation. With the lower amounts shown by the literature (such as 0.5 to 1.5 percent of the vehicle), the effects of this invention are not achieved.

EXAMPLE 16

A dispersion of pigments having different specific gravities was prepared by the method of Example 1 using the following composition.

| Pigment Dispersion | |
|---|---|
| Red lead (sp. gravity 9) | 300 grams |
| Titanium dioxide, rutile (sp. gravity 4.2) | 360 grams |
| Alkyd resin solution (long oil soybean alkyd 70% with mineral oil) | 330 grams |
| Toluene (solvent) | 100 grams |

A test paint was obtained which contained 660 grams of pigmentation in a total of 1090 grams of material. Therefore, 100 gm of paint contained 60.55 gm of pigmentation.

The red lead used was a so-called lead orthoplumbate ($Pb_3O_4$) which was derived from about 2 parts reddish yellow lead monoxide (or litharge, an oxide of the divalent lead) and about 1 part brownish lead dioxide which is an oxide of the tetravalent lead. The resulting red lead was brilliant red in color, but with slight variations in its development, this color shows variations. Therefore, each comparative study of varying coloring factors in test preparations required the use of the same base material. In this experiment, a lead orthoplumbate was used which was obtained as a high grade red lead oxide.

For this experiment the listed test paste was once diluted with toluene along (100 gm of test paste and 20 gm of toluene) and used as Test Paint S with zero percent lecithin.

To study the range between test paints with 3 percent and with 5.5 percent lecithin addition, as lecithin an oil-carrier lecithin type was used which had been industrially hydroxylated to obtain a lighter color and so to decrease the color effect of the lecithin in its crude form.

In each specimen, 100 gm of test paste was used and combined:
  (i) in Test Paint T with 3 percent of lecithin, i.e., 1.8 gm of lecithin and 18.2 gm of toluene
  (ii) in Test Paint U with 3.5 percent of lecithin, i.e., 2.1 gm lecithin and 17.9 gm of toluene
  (iii) in Test Paint W with 4 percent of lecithin, i.e., 2.4 gm of lecithin and 17.6 gm of toluene
  (iv) in Test Paint X with 4.5 percent of lecithin, i.e., 2.7 gm of lecithin and 17.3 gm of toluene
  (v) in Test Paint Y with 5 percent of lecithin, i.e., 3.0 gm of lecithin and 17.0 gm of toluene
  (vi) in Test Paint Z with 5.5 percent of lecithin, i.e., 3.3 gm of lecithin and 16.7 gm of toluene.

Each of the test paints was applied to white bond paper and its color reflectance on the applied surfaces was measured with the Photovolt Reflectometer using the blue filter readings in the percent of reflectance. Since in the paint without lecithin (Test Paint S) the pigments began to separate during the drying of the applied coatings, the dry appearance was streaky. Therefore, the readings on six different locations with the blue filter varied by 20 percent.

In Test Paint T with 3 percent of lecithin this difference between reading sites had decreased to 8.8 percent; with Test Paint U with 3.5 percent of lecithin the difference had decreased to 5.3 percent; with Test Paint W with 4 percent of lecithin the difference had decreased to 4 percent. But with any increasing amount of lecithin this difference decreased considerably. With 4.5 percent of lecithin (Test Paint X) the difference amounted to 1.5 percent and with 5 percent of lecithin (Test Paint Y) and with 5.5 percent of lecithin (Test Paint Z) the surface was uniform or the difference between readings amounted to zero percent. These values refer to freshly prepared paints and their applied films.

After the paints were allowed to stand for 12 weeks, then reshaken for 2 minutes and applied again to white bond paper, the average values of four different reading sites were compared with the average of the readings on the applied freshly prepared paints. Without lecithin, with 3 percent of lecithin and with 3.5 percent of lecithin the remixed paints varied in the average reflectance versus that of the freshly prepared paints by about 9 percent; but with 4 percent and with 4.5 percent of lecithin this difference had dropped to 3 percent; and with 5 percent and 5.5 percent of lecithin, it had dropped to about zero.

DIRECT APPLICATION OF LECITHIN TO PIGMENT SURFACES

EXAMPLE 17

As pigments the same red lead pigment and the same rutile titanium dioxide pigment were used as in Example 16, but the following method of application was used:

Preparation of the pigment dispersions:

| SAMPLE NO.: | 17-1 | 17-2 | 17-3 | 17-4 | 17-5 | 17-6 | 17-7 |
|---|---|---|---|---|---|---|---|
| Red lead (Lead orthoplumbate), gm | 50 | 50 | 50 | 50 | 50 | 50 | 50 |
| Titanium dioxide, rutile, gm. | 60 | 60 | 60 | 60 | 60 | 60 | 60 |
| Predispersion of: | | | | | | | |
| Oilcarrier lecithin, gm., in | 2.75 | 3.3 | 3.8 | 4.4 | 4.95 | 5.5 | 6 |
| | 2.5% | 3% | 3.5% | 4% | 4.5% | 5% | 5.5% |
| Mineral spirits (odorless grades), gm | 9 | 9 | 9 | 9 | 9 | 9 | 9 |
| Each sample was mixed well and ballmilled 2 hours. | | | | | | | |
| Subsequent addition: | | | | | | | |
| Soybean alkyd, longoil, 70% M.S., gm | 55 | 55 | 55 | 55 | 55 | 55 | 55 |
| Mineral spirits, odorless, as diluent, gm | 60 | 60 | 60 | 60 | 60 | 60 | 60 |

Each sample ballmilled overnight.

Due to the first step of applying the lecithin to the pigmentation, the considerable differences between the uniformity of application (which, in Example 16, was found for the percentages of lecithin below 4 percent when used in prior prepared paint pastes) no longer were found when lecithin was used in amounts between 2.5 and 5.5 percent in the samples of this example, as the lecithin was applied to the pigment surfaces directly. (Again, this refers to percent of lecithin by weight based on the weight of the solid pigment components).

The blue filter reflectance readings on the freshly prepared paints and on the 2-week stored and then remixed paints showed on such direct lecithin application, even with low percentages of lecithin, the high effectiveness of this embodiment of this invention.

In Example 16 the reflectance readings of the applied freshly prepared and the stored and remixed paints varied by 9 percent for paints having 3 percent and 3.5 percent of lecithin and by 3 percent for paints having 4 percent and 4.5 percent of lecithin. But when the lecithin had been applied to the pigmentation directly and such treated pigments afterwards had been ball-milled with the vehicle (as in this example), the differences between the reflectance of the freshly made and of the stored, remixed paints in the same lecithin ranges were very minor. The applied stored and remixed paints with 3 percent and 3.5 percent of lecithin (in this example) showed about the same difference in reflectance compared with the reflectance of the freshly prepared paints using 4 percent, 4.5 percent and 5 percent. This difference in reflectance amounted in these paint applications to 3.43 percent, 3.35 percent, 3.28 percent, 4.2 percent and 3.75 percent, respectively.

Therefore, the process of coating the pigmentation directly with lecithin materials before introducing them into the paint vehicle is not only unexpectedly more effective, but also unexpectedly more economical.

EXAMPLE 18

In order to further establish the effectiveness of even lower amounts of preapplied lecithin on pigment surfaces, this example used lecithin in amounts of zero and 2 percent. Otherwise the formulation of the test paints was the same as used in Example 17—also a higher grade of pure lead orthoplombate was used.

The blue filter reflectance readings were compared between the freshly prepared test paint applications to white bond paper and the 2-week stored, remixed test paints. Here with a highly pure lead orthoplombate, the change in reflectance of the applied paints amounted, for the paint with zero percent lecithin, to 2.15 percent, decreasing with 0.5 percent lecithin to 1.23 percent (a decrease by 57 percent).

By further decreasing the amount in the range between 1 percent, 1.5 percent and 2 percent, the differences between the freshly prepared paint already reached a very low level of 0.09 percent, 0.17 percent and 0.26 percent, respectively. This shows the very high efficiency of the direct use of (application) of lecithin on the pigmentation in amounts of 0.5 percent and above. This is considerable and unexpected progress over the prior art of introducing the lecithin into predispersed coating materials. Also, correspondingly excellent results were obtained when a deoiled form of lecithin was used in solvent dispersions.

EXAMPLE 19

(a) 30 grams of cuprous oxide (Grade AA, Purple) was intensely wetted with 5 gm of a regular oil-carrier soybean lecithin (or with about ⅔ phosphatides and ⅓ oil carrier). Then 110 gm of a long oil alkyd resin solution (70% in mineral spirits) and 50 gm of odorless paint thinner were added. After three days of storage the ballmilled dispersion showed a soft sediment and was redispersed into a dense and uniform dispersion. This dispersion was applied to white bond paper and allowed to dry; and the dispersion (on the paper) was mounted at a distance of 4 inches from a 100 watt light bulb. The light strength which was transmitted was measured with a Weston light meter—a transmittance of only 40 to 30 foot candles was indicated.

(b) The amount of the applied lecithin to the pigment was increased and twice the preceding amount of lecithin (10 grams) was applied to the 30 gm of cuprous oxide. The so treated pigment was introduced into 110 gm of alkyd resin solution and 50 gm of odorless paint thinner. The ball-milled dispersion was again stored for three days. The resulting sedimentation was evenly dispersed and more uniform, and the redispersed applied paint coating allowed on paper only 35 to 30 foot candles to penetrate.

(c) The same amount of cuprous oxide was ballmilled without lecithin, using only 110 gm of long oil Soya alkyd solution and 50 gm of thinner. The ballmilled dispersion was stored for three days. The resulting sediment was a packed matter which was not redispersible upon shaking it and was irregular in subsequent application. Therefore, the dispersion applied to white bond paper allowed, under the same test conditions, the transmittance of light varying on different places between 65 and 50 foot candles. Without the lecithin treatment of the pigment surface, an ineffective redispersion condition existed. Such redispersion condition was relieved and improved when the pigment has been surface-treated with varying amounts of lecithin in accordance with this invention.

EXAMPLE 20

Using a water-dispersible modification of lecithin, 50 gm of rutile titanium dioxide was milled with 3.5 gm of the water-dispersible lecithin. Then 50 gm of the so-treated pigment was introduced into 500 gm water to make a dispersion. For comparison, 50 gm of the same titanium dioxide was milled in water without lecithin and the mixture was then diluted to form a 500 gm water dispersion. When both dispersions had been stored for one week, the untreated pigment had fallen to the bottom of the container. The suspension of the lecithin-treated pigment showed only a slight water layer over the otherwise still suspended pigmentation.

EXAMPLE 21

As an example using a chemically-modified lecithin, specifically a hydroxylated lecithin, the following test was performed:

(a) 30 gm of zinc powder (Zinc Filler Grade for "zinc-rich" paints) was wetted with 50 gm of aliphatic thinner and ballmilled for 16 hours. The paste was diluted with 100 gm of long oil alkyd solution (50 percent) in mineral spirits and with 70 gm of aliphatic thinner as diluent. The paint was applied (with a 6-mil applicator) on a glass plate. The coating allowed 40 foot candles of light to be transmitted when tested in accordance with Example 16.

(b) 30 gm of the zinc powder was wetted with 5 gm of lecithin (i.e., a hydroxylated lecithin) and 45 gm of aliphatic paint thinner. The so-prepared paste was diluted with 100 gm of long oil soybean alkyd solution (70 percent) and 70 gm of thinner. When this paint, with the lecithin-treated pigmentation, was applied with a 6-mil applicator to a glass plate, only 12 foot candles of light were transmitted. This represents only 30 percent of the amount of light transmitted using the same pigment application which had been dispersed without direct lecithin treatment.

TESTING THE INFLUENCE OF THE PIGMENT-LECITHIN TREATMENT ON THE DENSITY OF THE PAINT FILM:

EXAMPLE 22

(a) In order to establish that, despite the surface-coating of the pigments with the lecithin, the resulting dispersed paint gives a very dense and uniform coating film, the following example was performed. 320 gm of synthetic red iron oxide was milled in 250 gm of soybean alkyd (70 percent) with 1.2 gm of cobalt octoate and 1.2 gm of manganese octoate driers. When no lecithin had been added, the resulting paint had a Brookfield viscosity of 23.0 cps (with spindle No. 4, speed 6 rpm and 100 scale). It required dilution with 7 gm of aliphatic thinner of 142 gm of paint to obtain a viscosity of 9 cps before application. When the same paint was prepared, but included 14.2 gm hydroxylated soybean lecithin in the pigment paste preparation, the viscosity was 34.3 and required 12 gm of solvent in order to obtain a viscosity of 9.5 cps. Each of the two paints having the same viscosity was applied in two coats on the gummed side of a strong gummed paper. After drying, the papers were immersed in water in order to loosen the gum underneath the paint films. The freed films were washed and allowed to dry. Then each film was mounted on top of a beaker which contained weighed amounts of water any by continued measurements the rate was determined at which the water vapors were capable of escaping through each of the films. After 60 days at room temperature, 10 percent of the water had escaped through the film without lecithin treatment, but only 5 percent of the water had escaped through the film prepared from the paint with lecithin treatment.

(b) In testing the influence of the applied lecithin coating layer to the pigmentation on the resulting porosity of the completed and applied paint, additional tests were made according to ASTM method D-3258-73. No increase in film porosity was found due to such added surface coating of the pigments.

EXAMPLE 23

In copending application USSN 556,309, the addition of lecithin to a premilled paste of mixed pigments with a phenolic resin vehicle and diluent caused, upon storage, a sedimentation which was soft and remiscible, instead of the quite hard sedimentation with poor remiscibility when no lecithin was added. Even with lecithin there was still some layer formation upon settling of the mixed pigmentation. But the difference in color between such layers was small compared to the layers in the paint without lecithin.

On the other hand, when 5.2 gm of oil-carrier type lecithin was added to the pigment mixture of 150 gm of red lead oxide and 180 gm of rutile titanium dioxide and the mixture was then milled with 165 gm of phenolic resin vehicle and 208 gm of toluene, such paint (with direct application of the lecithin to the pigment surfaces) after two weeks of storage showed very little sedimentation and such layers as developed varied in their blue-filter reflectance by only 2.5 percent. On remixing, the initial color was almost completely restored.

EXAMPLE 24

In this further example of the dispersing effect of a lecithin treatment, needle-shaped or acicular magnetic iron oxides such as Gamma $Fe_2O_3$), which are produced in the arts for use as magnetic layers in recording tapes, were first thoroughly mixed with a lecithin, such as a hydroxylated lecithin. In order to obtain the very thin organic surface layers on the pigment, the lecithin can be applied also in a predissolved form, using volatile solvents as diluents. Such readily volatile solvent is not later retained in the pigment application (film) and does not therefore interfere with the magnetic properties of the applied film. The applied layer on a glass slide is so dense that when it is held against a 100 watt light bulb, no uncovered areas are detected on the applied layer. To further protect such applied layer, a surface application of a diluted polymer resin solution, such as a solution of 25 gm of vinyl acetate-vinyl chloride copolymer (VYHH) resin in 100 gm of method isobutyl ketone and 100 gm of toluene can be applied. Upon drying the thin film solidly protects the applied lecithin treated magnetic oxide.

THE APPLICATION TO WATER-BASED COATING COMPOSITIONS

EXAMPLE 25

Since plant phosphatides are derived from oil bearing seeds, these lecithin materials are obtained either in a state where they contain oil components or where they are at least compatible with oils and oleoresinous compounds. In order to use the principle of treating the pigment surfaces with lecithin in water-based coating systems, such as latex paints, it is convenient to utilize so-called water-dispersible lecithins. These are produced either by modifying the lecithin and combining it with other synthetic water-dispersible surface active agents. These then represent water-dispersible wetting compounds containing lecithin and deriving from there the benefits of the lecithin application. Or, the lecithin is modified chemically so that it becomes water-dispersible itself. These products represent straight water-dispersible lecithins. Both forms of lecithin can be used in applying the present invention to the pigmentation of water-based paints.

(a) When a mixture of 60 gm of rutile titanium dioxide and 40 gm basic lead silicochromate was milled in 150 gm of acrylic latex and 50 gm of water and then the resulting paste was diluted with water in a ratio of two parts of paste and one part of water (without lecithin), the paint separated after two days storage into a lighter colored upper layer and a darker lower layer. When these were applied to white bond paper, there was a difference of 35.8 percent between the blue-filter reflectance readings of both and the layers did not fully remix.

(b) When, in diluting the paste of ten percent (of the weight of the paste), lecithin was added and the amount of water was then lowered by these 10 percent in weight, the resulting difference between the layers was decreased to 18.5 percent.

(c) But when two grams of water-dispersible lecithin was added to the pigments, before or during the addition of the latex, and the water-diluent and the ballmilling was then made directly, the difference in the colors of the layers became negligible and amounted to about 4.2 percent. In this case the water-dispersible lecithin used was of the type of modified lecithin in combination with a fluid wetting agent.

EXAMPLE 26

Using chemically modified, water-dispersible lecithin, such as a partially hydrolyzed lecithin, in the same formulation as used in Example 23, it is evident that no addition of a supplementary water-dispersible wetting agent is required. A pigment mixture of 60 gm of titanium dioxide and 40 gm of basic lead silicochromate without lecithin with 150 gm of acrylic latex and 40 gm of water was placed in a ballmill. A thickener of 2.5 gm of hydroxyethyl cellulose in 100 gm of water (or other thinner) was added to the paste. The paste was ball-milled. The paint applied on white bond paper had a blue-filter reflectance of 44.0, but when the paste that was ballmilled also contained, with the pigmentation, 2 gm of chemically-modified, water-dispersible lecithin, the resulting applied paint has an increased reflectance of 47.5 due to the higher dispersing properties of the modified lecithin.

USE OF PRE-DILUTED LECITHIN:

EXAMPLE 27

To show that it is not necessary to add to the pigmentation the water-dispersible lecithin in a straight form, but that it is possible to premix it first with water and to add it then to the pigmentation, the 2 parts of water-dispersible lecithin used in Example 24 was first premixed with 8 gm of water and this premix was added to the pigmentation. Otherwise the same formulation was used. The applied paint had the blue-filter reflectance of 46.5, that is, 5.68 percent above the reflectance of the paint (of Example 24) which did not contain lecithin. When the test paints were stored for 2 weeks, then reshaken and applied on white bond paper, the paint without lecithin had a blue-filter reflectance of 43.5—but both paints with lecithin (the one using straight water-dispersible lecithin and the other using the lecithin after premixing it with water) had the identical reflectance of 45.5.

EXAMPLE 28

The procedure of Example 27 was used on oil-carrier types of lecithin by first mixing it with a diluent for oleoresinous coatings and using it then in the pigment paste. A mixture of 50 gm of red lead oxide and 60 gm of titanium dioxide was ballmilled in one case with 9 gm of benzene without lecithin. An identical pigment mixture was also ballmilled with a mixture of 0.7 gm of oil-carrier lecithin and 9 gm of benzene. Then each paste was placed in a solution of 55 gm of long oil alkyd resin (70 percent) and 60 gm of benzene. After storing the paints for 5 days, remixing them and applying them to white bond paper, the blue-filter reading of the applied paint without lecithin was very irregular, due to the poor uniformity of dispersion, and varied between 41.5 and 37.5. The paint with the 0.7 gm oil-carrier lecithin (premixed with 9 gm benzene) had in four readings a high degree of uniformity, varying only between 31.5 and 32.0 percent.

EXAMPLE 29

The amount of lecithin used in the embodiment where the pigment is first coated with lecithin is not critical. In another use of the same formulation as used in Example 26, five times as much oil-carrier type lecithin was used (i.e., 3.5 gm). As a result the pigment dispersion as well as the color intensity was increased, but the uniformity of the applications was the same.

EXAMPLE 30

The lecithins can be premixed with diluents and can so be applied to the pigmentation in the ballmilling, either alone or under addition of a film forming fluid ("vehicle"). The lecithins can also be premixed with a synthetic wetting agent or with a wetting agent after having been diluted with a diluent—they can be introduced as such into the pigment dispersion. But such mixing of lecithins with conventional wetting agents does not result in a chemical interreaction between them. It is possible to separate them afterwards again by selected solvents. And the infrared spectra taken before the admixing and the one taken after removal of the admixed surfactants are nearly or completely identical.

EXAMPLE 31

The predispersing of the lecithin matter in fluids ("solvents") and then utilizing these solutions for the direct treatment of dry pigments allows also the use of solid deoiled lecithins, such as commercial "granular" lecithin, by first dissolving them in a solvent or in a mixture of solvents and applying such dispersion to the treatment of pigments for their uniform dispersion. For instance, a 10 percent dispersion of granular lecithin in toluene was found to be effective in this application. But more or less concentrated solutions can be used as well.

What is claimed is:

1. In the production of pigmented filmforming compositions comprising finely divided pigment particles or mixtures of such pigment materials and a drying vehicle, where the finely divided pigment particles or mixtures of such pigment materials composed of units of widely varying specific gravities are held in uniform dispersion and readily kept fully redispersible when conglomerated during storage into a packed and otherwise poorly dispersible sedimentation the improvement which comprises either incorporating at least 4 percent to 10 percent of lecithin or modified lecithin into the pigmentation already predispersed in the vehicle, based on total pigmentation, said modification being achieved by bleaching or by hydroxylation of lecithin, or pretreating the finely divided pigment particles with lecithin or modified lecithin first in order to provide polymer or heterophase phosphatide on the surface of the particles before said particles are mixed with the film-forming materials, so that repulsive conditions are obtained between different such particles, in order to facilitate dispersion of such particles and to avoid, when dispersed in fluid and after a storage period, their conglomeration into a packed and poorly dispersible sedimentation.

2. The process as claimed in claim 1 wherein 0.5 to 3.5 parts of plant phosphatides are applied to 100 parts of pigment.

3. The process as claimed in claim 1 wherein the pigmented film-forming composition contains dispersing fluids which are film-forming materials for coating compounds and paints.

4. The process as claimed in claim 1 wherein the plant phosphatides are used without first separating them into (a) the lower molecular weight and alcohol-soluble fraction and (b) the higher molecular weight alcohol-insoluble or micellular fraction.

5. The process as claimed in claim 1 wherein lecithin is separated into an alcohol-soluble fraction and an alcohol-insoluble fraction, and primarily the alcohol-insoluble fraction of lecithin is used as the lecithin component in the pigmented film-forming composition.

6. The process as claimed in claim 1 wherein the lecithin in its crude form contains some oil substance as carrier substance.

7. The process as claimed in claim 1 wherein the crude lecithin has been chemically modified by bleaching or hydroxylation.

8. The process as claimed in claim 1 wherein the lecithin has first by itself been modified to make it water dispersible for the dispersion of the pigments.

9. The process as claimed in claim 1 wherein the lecithin has been combined with water dispersible synthetic wetting agents for the dispersion of the pigments.

10. The process as claimed in claim 1 wherein the lecithin is diluted with a fluid, which is compatible with the drying vehicle, before the lecithin is combined with the drying vehicle.

11. The process as claimed in claim 10 wherein, in diluting the lecithin with the fluid, a solvent is used as the fluid and is so readily and fully volatile that using it as diluent in a very thin lecithin layer it will allow its use on magnetic pigments for their application on tapes without interfering with the magnetic properties of the applied layer.

12. Finely divided pigment material which has been surface-treated with the higher molecular weight constitutents contained in lecithin or lecithin which has been modified by bleaching or by hydroxylation.

13. The process of overcoming in a coating composition that includes a fluid vehicle which is compounded with a mixture of powdered or granular solid pigment components, said solid pigment components having different specific gravities, the tendency of said solid pigment components, upon storage, to separate from each other in accordance to their specific gravity, which comprises incorporating a lecithin, or modification thereof, into said coating composition containing said solid pigment components in an amount effective to significantly improve the storage stability of said solid pigment components in said coating composition, said modification having been obtained by hydroxylating or by bleaching or by reacting an organometal acetate with said lecithin, said effective amount being 4.0 percent by weight, or more, based on the weight of said solid pigment components, said effective amount being more than the amount of said lecithin, or modification thereof, required for the optimum wetting and dispersion of said solid pigment components in said coating composition, and said coating composition returning to the original color and state said coating composition originally had upon mixing or shaking of said coating composition after a storage period.

14. The process claimed in claim 13 wherein said coating composition is a paint.

15. The process claimed in claim 14 wherein said solid pigment components are metal oxides or silicon oxides.

16. The process claimed in claim 14 wherein said fluid vehicle is a drying coating vehicle.

17. The process claimed in claim 14 wherein said lecithin is used in the form of a combination of a low-molecular alcohol-soluble fraction thereof and of a higher-molecular alcohol-insoluble fraction thereof.

18. The process claimed in claim 14 wherein said lecithin is used in a crude form, which retains some of the oil matter of the plant seeds from which said lecithin is obtained, said oil substance acting as a carrier for the phosphatides in the lecithin.

19. The process claimed in claim 18 wherein said oil carrier part in said crude lecithin has been chemically modified by hydroxylation or by bleaching.

20. The process claimed in claim 14 wherein at least two of said solid pigment components also have different color, this process also overcomes the tendency of such at least two said solid components to separately settle and this preserves the color of said paint.

21. The process claimed in claim 14 wherein said paint is in emulsion form and wherein said lecithin has first been modified into a more water dispersible form and then is used in said emulsion, thereby avoiding separation of said solid pigment components.

22. The process claimed in claim 4 wherein said lecithin is used in combination with a minor amount of a synthetic surfactant which does not decrease the effectiveness of said lecithin in overcoming the tendency of said solid pigment components to separate according to their specific gravity.

23. The process claimed in claim 14 wherein said lecithin is a soybean lecithin or corn lecithin and wherein said lecithin is used in a form which consists of a mixture of at least two fractions, at least one being higher molecular and alcohol insoluble.

24. The process claimed in claim 14 wherein said amount of said lecithin, or modification thereof, is between 4 and 10 percent by weight based on the weight of said solid pigment components.

25. The coating composition that comprises a fluid vehicle which is compounded with a mixture of powdered or granular solid pigment components, and contains lecithin, or modification thereof, said modification having been obtained by hydroxylation or bleaching lecithin, said lecithin, or modification thereof, being present in an amount effective to significantly improve the storage stability of said pigments components, said effective amount being 4.0 percent by weight, or more, based on the weight of said solid pigment components in said coating composition, said solid pigment components having different specific gravities, the tendency of said solid pigment components, upon storage, to separate from each other in accordance with their specific gravity, and said coating composition returning to the original color and state said coating composition originally had upon mixing or shaking of said coating composition after a storage period.

26. The coating composition claimed in claim 25 wherein said coating composition is a paint.

27. The coating composition claimed in claim 25 wherein said amount of said lecithin, or modification thereof, is between 4 and 10 percent by weight based on the weight of said solid pigment components.

28. The process of overcoming in a coating composition that includes a fluid vehicle which is compounded with a mixture of powdered or granular solid pigment components, said solid pigment components having different specific gravities, the tendency of said solid pigment components, upon storage, to separate from each other in accordance to their specific gravity, which comprises treating said solid pigment components with a lecithin or modification thereof, said modification having been obtained by hydroxylating or bleaching lecithin, and then forming said coating composition containing said solid pigment components, said lecithin being used in an amount effective to significantly improve the storage stability of said solid pigment components in said coating composition, and said coating composition returns to the original color and state said coating composition originally had upon mixing or shaking of said coating composition after a storage period.

29. The process claimed in claim 28 wherein said coating composition is a paint.

30. The process claimed in claim 29 wherein said fluid vehicle is a drying coating vehicle.

31. The process claimed in claim 29 wherein said lecithin is used in the form of a combination of a low-molecular alcohol-soluble fraction thereof and of a higher-molecular alcohol-insoluble fraction thereof.

32. The process claimed in claim 29 wherein said lecithin is used in a crude form, which retains some of the oil matter of the plant seeds from which said lecithin is obtained, said oil substance acting as a carrier for the phosphatides in the lecithin.

33. The process claimed in claim 29 wherein said oil carrier part in said crude lecithin has been chemically modified by hydroxylation or by bleaching.

34. the process claimed in claim 29 wherein at least two of said solid pigment components also have different color, this process also overcomes the tendency of such at least two said solid components to separately settle which preserves the color of said paint.

35. The process claimed in claim 29 wherein said paint is in emulsion form and wherein said lecithin has first been modified into a more water dispersible form and then is used in said emulsion, thereby avoiding separation of said solid pigment components.

36. The process claimed in claim 29 wherein said lecithin is a soybean lecithin or corn lecithin and wherein said lecithin is used in a form which consists of a mixture of at least two fractions, at least one being higher molecular and alochol insoluble.

37. The coating composition that comprises a fluid vehicle which is compounded with a mixture of powdered or granular solid pigment components, which has been pretreated with lecithin, or modification thereof, said modification having been obtained by hyroxylation or bleaching lecithin, said lecithin, or modification thereof, being present in an amount effective to significantly improve the storage stability of said pigments components, said effective amount being more than the amount of said lecithin, or modification thereof, required for the optimum wetting and disperson of said solid pigment components in said coating composition, said solid pigment components having different specific gravities, the tendency of said solid pigment components, upon storage, to separate from each other in accordance with their specific gravity, and said coating composition returning to the original color and state coating composition originally had upon mixing or shaking of said coating composition after a storage period.

38. The coating composition claimed in claim 37 wherein said coating composition is a paint.

39. The coating composition claimed in claim 37 wherein said amount of said lecithin, or modification thereof, is between 1 and 10 percent by weight based on the weight of said solid pigment components.

40. The process of overcoming in a coating composition that includes a fluid vehicle which is compounded with a mixture of powdered or granular solid pigment components, said solid pigment components having different specific gravities, the tendency of said solid pigment components, upon storage, to separate from each other in accordance to their specific gravity, which comprises treating said solid pigment components with a modified lecithin, said modification having been obtained by reacting organometal acetate with lecithin, and then forming said coating composition containing said solid pigment components, said modified lecithin being used in an amount effective to significantly improve the storage stability of said solid pigment components in said coating composition, said coating composition returning to the original color and state said coating composition originally had upon mixing or shaking of said coating composition after a storage period, and having anitmold and antifouling properties.

41. The process claimed in claim 40 wherein said organometal acetate is an organolead acetate or an organotin acetate.

42. Finely divided material which has been surface-treated with the higher molecular weight constitutents contained in lecithin which has been modified by the introduction of organometal acetate and which has antimold and antifouling properties.

43. Pigment material claimed in claim 42 wherein said organometal acetate is an organolead acetate or an organotin acetate.

44. The coating composition that comprises a fluid vehicle which is compounded with a mixture of powdered or granular solid pigment components, and contains modified lecithin, said modified lecithin having been obtained by reacting organometal acetate with lecithin, said modified lecithin being present in an amount effective to significantly improve the storage stability of said pigments components, said effective amount being 4.0 percent by weight, or more, based on the weight of said solid pigment components, of said modified lecithin, said effective amount being more than the amount of said modified lecithin required for the optimum wetting and dispersion of said solid pigment components in said coating composition, said solid pigment components having different specific gravities, the tendency of said solid pigment components, upon storage, to separate from each other in accordance with their specific gravity, said coating composition returning to the original color and state said coating composition originally had upon mixing or shaking of said coating composition after a storage period, and the toxic characteristics of said organometal acetate imparting to said lecithin their resistance to molds and to fouling media.

45. The coating composition claimed in claim 44 wherein said organometal acetate is an organolead acetate or an organotin acetate.

46. The process of overcoming in a coating composition that included a fluid vehicle which is compounded with a mixture of powdered or granular solid pigment components, said solid pigment components having different specific gravities, the tendency of said solid pigment components, upon storage, to separate from each other in accordance to their specific gravity, which comprises incorporating a modified lecithin into said coating composition containing said solid pigment components in an amount effective to significantly improve the storage stability of said solid pigment components in said coating composition, said modification having been obtained by reacting an organometal acetate with said lecithin, said effective amount being 4.0 percent by weight, or more, based on the weight of said solid pigment components, said effective amount being more than the amount of said modified lecithin required for the optimum wetting and despersion of said solid pigment components in said coating composition, said coating composition returning to the original color and state said coating composition originally had upon mixed or shaking of said coating composition after a storage period, and the toxic characteristics of said organometal acetate imparting to said lecithin their resistance to molds and to fouling media.

47. The process claimed in claim 46 wherein said organometal acetate is an organolead acetate or an organotin acetate.

* * * * *